United States Patent [19]

Inagawa et al.

[11] 4,453,260

[45] Jun. 5, 1984

[54] SYNCHRONIZING CIRCUIT FOR DETECTING AND INTERPOLATING SYNC SIGNALS CONTAINED IN DIGITAL SIGNAL

[75] Inventors: Jun Inagawa, Yokohama; Masahide Nagumo, Kawasaki; Tadashi Kojima, Yokosuka, all of Japan

[73] Assignee: Tokyo Shibaura Denki Kabushiki Kaisha, Kawasaki, Japan

[21] Appl. No.: 423,725

[22] Filed: Sep. 27, 1982

[30] Foreign Application Priority Data

Jun. 15, 1982 [JP]  Japan ................................ 57-102829
Jun. 15, 1982 [JP]  Japan ................................ 57-102838

[51] Int. Cl.³ .............................................. H04J 3/06
[52] U.S. Cl. .................................... 375/116; 375/119; 370/105
[58] Field of Search ............... 375/111, 114, 116, 119; 370/105, 100

[56] References Cited

U.S. PATENT DOCUMENTS

3,978,285  8/1976  Tan et al. .............................. 375/119
4,275,466  6/1981  Yamamoto ............................ 375/113
4,347,606  8/1982  Hoogeveen ........................... 370/105

Primary Examiner—Robert L. Griffin
Assistant Examiner—Albert W. Watkins
Attorney, Agent, or Firm—Cushman, Darby & Cushman

[57] ABSTRACT

A synchronous circuit comprises a sync signal detecting circuit connected to receive a digital signal with a plurality of frames each consisting of N bits and containing a frame sync signal to detect a sync signal in each frame, and a sync protecting circuit for producing a sync control signal synchronized with the detection of the sync signals and interpolating the sync control signal every frame when the sync signal is not detected. The sync protecting circuit has a counter for counting the number of frames in which the sync signals are not detected. A circuit is provided to quickly synchronize the sync protecting circuit with the detection of the sync signal by the sync signal detecting circuit when noise is produced by the sync signal detecting circuit and then a sync signal is detected after a given value has been counted by the counter.

2 Claims, 10 Drawing Figures

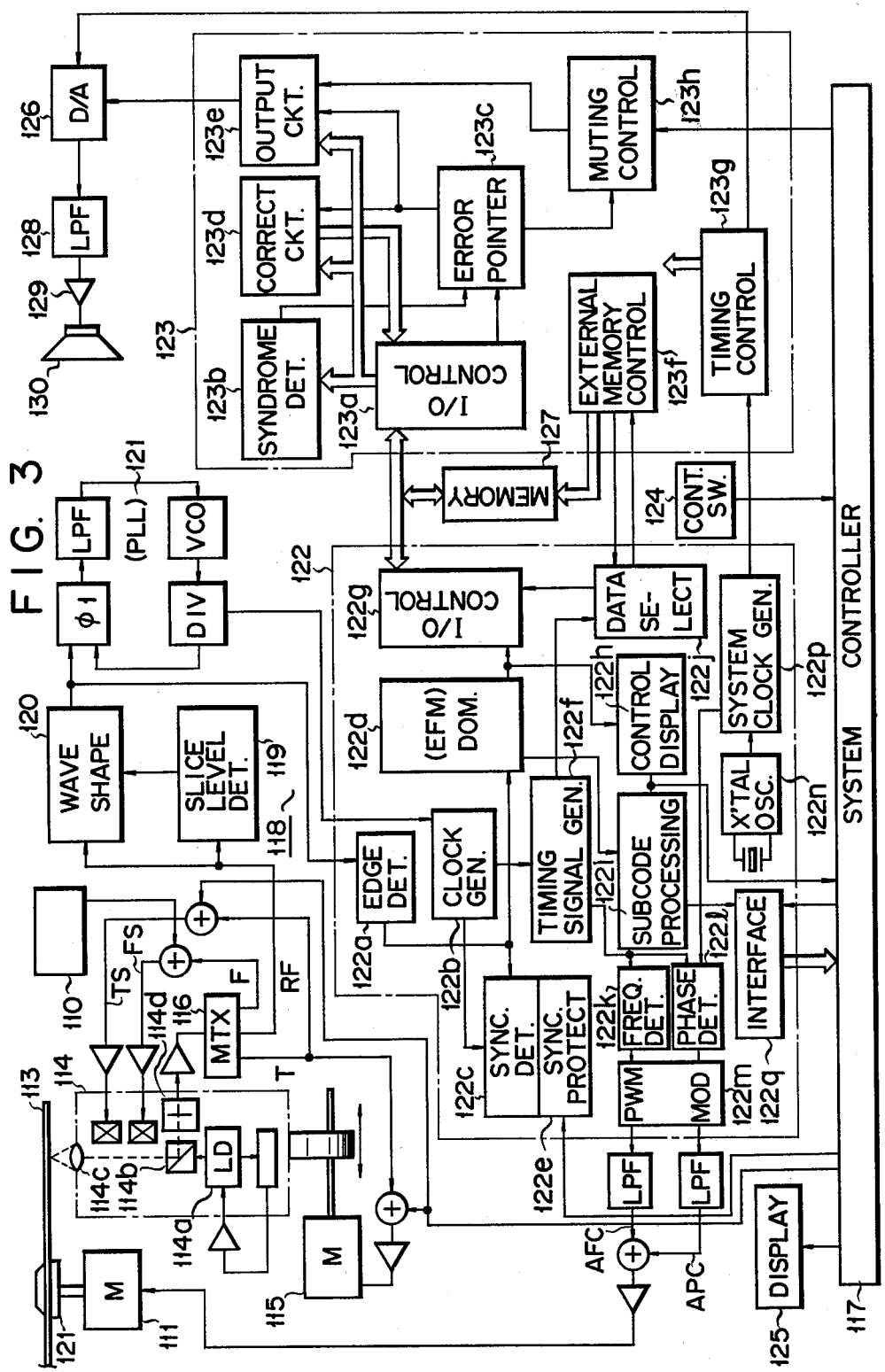

SYNCHRONIZING CIRCUIT FOR DETECTING AND INTERPOLATING SYNC SIGNALS CONTAINED IN DIGITAL SIGNAL

BACKGROUND OF THE INVENTION

The present invention relates to a synchronizing circuit for detecting sync signals contained in a digital input signal and for properly protecting the synchronization when the sync signals drop out.

Digital audio systems have been recently developed because an audio reproduction of high quality can be achieved. The digital audio systems are grouped into a system which uses a magnetic tape and a system which uses a disc. As one example of the latter system, a compact disc (CD) system in which digital data recorded on a compact disc are optically read out by a laser beam has been developed and put into practical use.

In the case of the compact disc, as is well known, digital data are subjected to an EF (eight-bit to fourteen-bit) modulation arranged in one frame in a given format to be recorded on a disc. One frame of digital data includes a frame sync signal disposed at the head of the frame, a plurality of audio data words, and error correcting bits and consists of 588 channel bits in total. The sync signal consists of 24 channel bits and has a specific variation pattern sufficient to be distinguished from any other digital data.

In audio reproduction the frame sync signals are used for generating control signals for dividing frames and dividing digital data in one frame at a given unit. To this end, the playback apparatus is provided with a sync signal detecting circuit. A sync protecting circuit is further used in combination with the sync signal detecting circuit for interpolating sync signals when the sync signals drop out due to scratches on a disc.

FIG. 1 shows a prior sync circuit containing the sync signal detecting circuit and the sync protecting circuit, and FIGS. 2A and 2B are timing diagrams for explaining the operation of the sync circuit of FIG. 1.

In FIG. 1, a digital input signal applied to an input terminal 1 and having N bits per frame is applied to a sync signal detecting circuit 3, together with a clock signal generated on the basis of an output signal of a PLL circuit for detecting clock components contained in the digital signal reproduced from a disc, thereby to detect a frame sync signal for each frame. The output of sync signal detecting circuit 3 is connected to a gate circuit 4. The output of gate circuit 4 is connected to a clear terminal of a 1/N frequency divider (scale-of-N counter) for frequency-dividing the clock signal. The output of 1/N frequency divider 5 is connected to a window generator 6 of which the output is connected to a counter 7 which is cleared by an output signal of gate circuit 4. A selector 8 couples the output of window generator 6 or the counter 7 to a control terminal of gate circuit 4. The output of 1/N frequency divider 5 is connected to an output terminal 9.

In the sync circuit thus constructed, sync signal detecting circuit 3 detects the sync signal contained in each frame of the input signal and outputs a detect signal to gate circuit 4. Gate circuit 4 controls the supply of the sync detect signal from sync signal detecting circuit 3 to 1/N frequency divider 5 according to an output signal of selector 8. Frequency divider 5 is cleared every time an output signal of gate circuit 4 becomes high to provide a frame sync control signal to output terminal 9 for every N bits of the clock signal. Window generator 6 increases its output during a period of several bits in and near the N-th bit at which the next frame sync control signal is to be produced starting from a bit at which a frame sync control signal is produced by frequency divider 5, that is to say, generates a window to make gate circuit 4 conductive through selector 8. When sync signal detecting circuit 3 is well synchronized with frequency divider 5, selector 8 applies a window output of window generator 6 to gate circuit 4 to apply an output signal of sync signal detecting circuit 3 to frequency divider 5, through a window corresponding to the sync signal of the preceding frame. Owing to this operation, an erroneous operation due to noise other than true sync detect signals can be prevented.

If the frame sync signals cannot be detected due to dropout or the like, output signals of sync signal detector circuit 3 and gate circuit 4 cannot be obtained as shown in FIG. 2A. Even in this case, output signals appear every N bits at output terminal 9 through the frequency dividing operation of frequency divider 5, as shown in FIG. 2A. This indicates that the sync signals are interpolated. When the sync signals are not detected, counter 7 is not cleared and counts up the output of gate 4 for every frame by the window outputs of window generator 6. When counter 7 reaches a preset count, e.g. four frames, its output becomes high. In response, selector 8 enables gate circuit 4. Under this condition, a first output signal of sync detector circuit 3 passes through gate circuit 4 to clear frequency divider 5 and counter 7. When frequency divider 5 is cleared, an output signal appears at output terminal 9.

However, as shown in FIG. 2B, if a first output signal of sync signal detector circuit 3 is noise after the output of counter 7 has gone high, then the noise output clears frequency divider 5 and counter 7. Therefore, window generator 6 produces window outputs which are dependent on the noise output. Accordingly, notwithstanding, the sync signals are correctly detected after the noise output, since the window outputs of window generator 6 and the sync detect output signals of sync signal detector circuit 3 are not timed, no output signal is produced by gate circuit 4. After frequency divider 5 has been cleared by the noise output erroneous sync control signals are produced every N bits at output terminal 9 through the frequency dividing operation. Frequency divider 5 and sync signal detector 3 are synchronized with each other when the output of counter 7 goes high and a correct sync signal is detected.

As described above, the prior art sync circuit has a disadvantage in that, when some sync signals drop out due to some cause, erroneous sync control signals may be formed by the influence of noise so that the synchronizing operation of a digital signal processing circuit is lost.

SUMMARY OF THE INVENTION

Accordingly, an object of the present invention is to provide a synchronizing circuit for detecting sync signals and protecting synchronization in a device for processing a digital signal including a plurality of frames each having a frame sync signal, which is arranged to quickly restore the synchronization after noise is detected as a sync signal.

According to an aspect of this invention there is provided a synchronizing circuit comprising frame sync signal detecting circuit means connected to receive clock pulses and a digital input signal having a plurality of frames each consisting of N bits and having a frame sync signal for detecting the frame sync signal to produce sync detect output signal, first counting means counting the clock pulses and connected to receive an output signal of the frame sync signal detecting circuit means for producing an output signal synchronized with the output signal of the sync signal detecting circuit means, the first counting means being so arranged to be cleared by the output signal of the sync signal detecting circuit means and to provide an output signal each time N clock pulses are counted even if the sync signal detecting circuit means fails to detect the frame sync signal, first window generating means responsive to the first counting means for generating a window output signal at intervals at which the sync signal detecting circuit means detects the sync signals, second counting means for counting the window output signal of the first window generating means, the second counting means being cleared by each output signal of the sync signal detecting circuit means when the first counting means is synchronized with the sync signal detecting circuit means, and having its output state changed from a first state to a second state when the second counting means counts a given number of window output signals of the first window generating means when the sync signal detecting circuit means fails to detect the sync signals, a first gate circuit connected between the sync signal detecting circuit means and the first and second counting means which, when enabled, supplies an output signal of the sync signal detecting circuit means to the first and second counting means to clear the first and second counting means, a second gate circuit connected to receive the output signal of the sync signal detecting circuit means, the second gate circuit being enabled by an output signal of the second counting means when the second counting means is in the second output state, third counting means for counting the clock pulses to provide an output signal each time the third counting means counts N clock pulses, the third counting means being cleared by an output signal of the first and second gate circuits, a second window generating means connected to said third counting means for forming a window output signal at time intervals taken for the third counting means to count substantially N clock pulses, and means responsive to the second counting means for selectively coupling the output signals of the first and second window generating means to the first gate circuit to enable said first gate circuit, such that the window output signal of the first window generating means is applied to the first gate circuit when the second counting means is in the first output state, and the window output signal of the second window generating means is applied to the first gate circuit when the second counting means is in the second output state.

According to another aspect of this invention there is provided a synchronizing circuit comprising frame sync signal detecting circuit means connected to receive clock pulses and a digital input signal having a plurality of frames each consisting of N bits and having a frame sync signal for detecting the frame sync signal to produce sync detect output signal, first counting means counting the clock pulses and connected to receive an output signal of the frame sync signal detecting circuit means for producing an output signal synchronized with the output signal of the sync signal detecting circuit means, the first counting means being so arranged as to be cleared by the output signal of the sync signal detecting circuit means and to provide an output signal each time N clock pulses are counted even if the sync signal detecting circuit means fails to detect the frame sync signal, window generating means responsive to the first counting means for generating a window output signal at intervals at which the sync signal detecting circuit means detects the sync signals, second counting means for counting the window output signal of the window generating means, the second counting means being cleared by each output signal of the sync signal detecting circuit means when the first counting means is synchronized with the sync signal detecting circuit means, and having its output state changed from a first state to a second state when the second counting means counts a given number of window output signals of the first window generating means when the sync signal detecting circuit means fails to detect the sync signals, a first gate circuit connected between the sync signal detecting circuit means and the first counting means which, when enabled, supplies an output signal of the sync signal detecting circuit means to the first counting means to clear the first counting means, a second gate circuit connected between the sync signal detecting circuit means and the second counting means, the second gate circuit being enabled by the window output signal of the window generating means to apply an output signal of the sync signal detecting circuit means to the second counting means to clear the second counting means, and means responsive to the second counting means to supply the window output signal of the window generating means to the first gate circuit when the second counting means is in the first output state to enable the first gate circuit each time the window output signal is produced, and to enable the first gate circuit until the second counting means is cleared when the second counting means is in the second output state.

BRIEF DESCRIPTION OF THE DRAWINGS

FIG. 3 is a block diagram of an optical digital audio disc playback apparatus to which the sync circuit according to the present invention is directed;

DETAILED DESCRIPTION OF THE PREFERRED EMBODIMENTS

Figure 1:
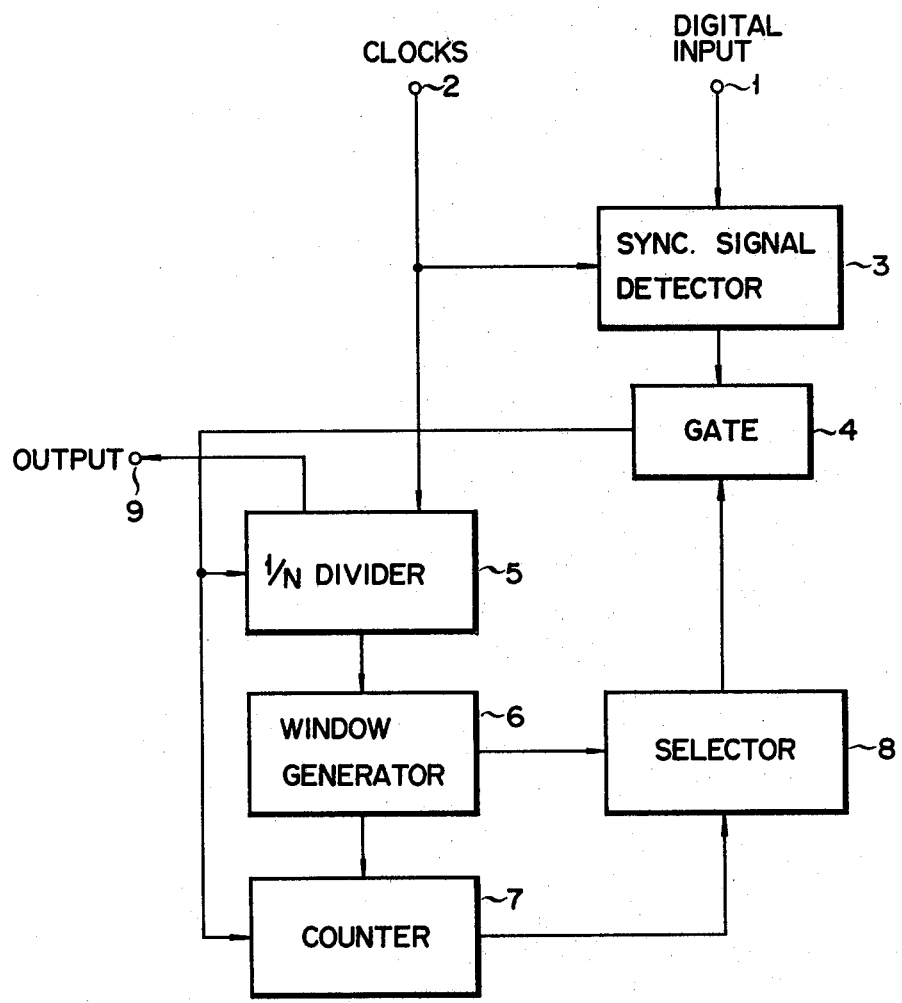
FIG. 1 is a block diagram of a prior art sync circuit.
Figure 2A:
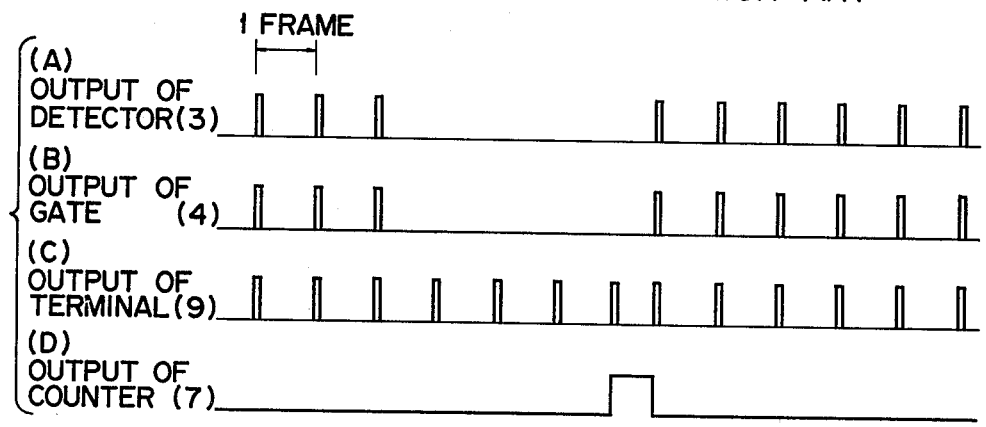
FIGS. 2A and 2B show timing diagrams useful in explaining the operation of the sync circuit of FIG. 1.
Figure 2B:
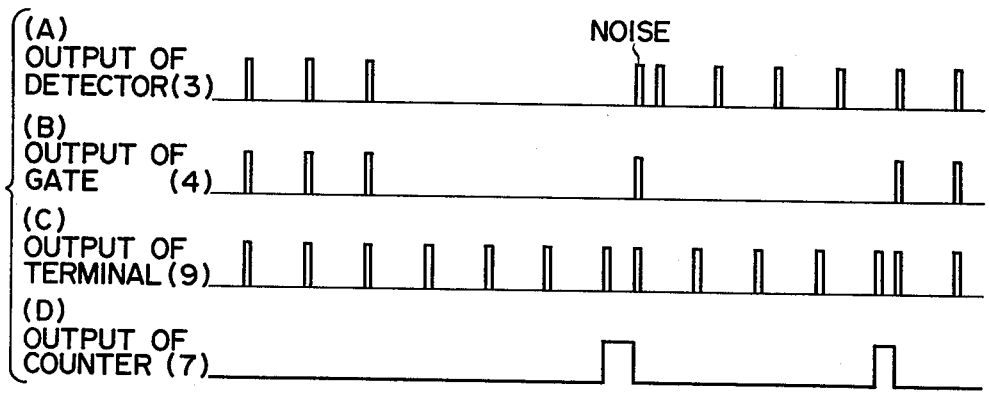

An outline of an optical digital audio disc playback system to which embodiments of the present invention are directed will be described briefly with reference to FIG. 3.

Digital data recorded on a disc 113 mounted on a turntable 121 driven by a disc motor 111 is picked up by an optical pick-up device 114 as shown in FIG. 3. Optical pick-up device 114 irradiates the recording surface of disc 113 with a laser beam emitted from a semiconductor laser 114a through a beam splitter 114b and an objective lens 114c. A laser beam reflected from pits formed on disc 113 which represent PCM digital data containing EF modulated and interleaved audio information signals is guided through objective lens 114c and beam splitter 114b to a four-photodetector unit 114d to produce four reproduced signals. The pick-up device is rectilinearly driven in the radial direction of disc 113 by means of a feed motor 115.

The four output signals of photodetector unit 114d are applied to a matrix circuit 116 to produce a focus error signal F, a tracking error signal T and a high frequency signal (modulated digital data) RF.

The focus error signal F, together with a focus search signal from a focus search circuit 110, is applied to a focus servo system FS of optical pick-up device 114. The tracking error signal T, together with a search control signal applied from a system controller 117, is applied to a tracking servo system TS of pick-up device 114 and to feed motor 115, thereby to perform a linear tracking control of the pick-up device.

The high frequency signal RF is applied as a main data component to a data processing system 118. In the data processing system, modulated digital data RF is led to a wave shaper circuit 120 controlled by a slice level (eye pattern) detector 119, where analog components are removed to extract only digital data components. The data components are applied to a synchronizing clock reproducing circuit 121 of PLL type and to an edge detector 122a of a first signal processing system 122.

A sync clock signal from sync clock reproducing circuit 121 is applied to a sync signal separation clock generating circuit 122b in first signal processing system 122, thereby forming a clock signal for sync signal separation.

Edge detector 122a detects edges (change points) of the high frequency signal RF which has been formed by NRZI modulating the EF modulated data (NRZ) to recover the EF modulated data. An output signal of edge detector 122a is led to a sync signal detector circuit 122c where the sync signals are detected using the clock signal from clock generator 122b. The output signal of edge detector is also applied to a demodulator circuit 122d where the respective EF modulated data are demodulated to the original bit number.

A sync detect signal from sync signal detector circuit 122c is applied through a sync protecting circuit 122e to a timing circuit 122f for generating timing signals for processing input data, together with clocks from clock generator 122b. Sync protecting circuit 122e interpolates sync signals for preventing an erroneous operation when sync signals are not detected by sync signal detector circuit 122c.

A demodulated signal from demodulator circuit 122d is applied to an input/output control circuit 123a of a second signal processing system 123 to be described later, through a data bus input/output control circuit 122g. A control signal as a subcode and a display signal component in the demodulated signal are applied to a control display processing circuit 122h and a subcode processing circuit 122i. The subcode data, which has been subjected to error detection and correction, is applied through an interface circuit 122q to a system controller 117.

System controller 117 is provided with a microcomputer, an interface circuit and a driver integrated circuit. System controller 117 controls the playback device to a desired state by a command given by control switches 124 and causes a display 125 to display the subcode, e.g. index data of reproduced music.

A timing signal from a timing signal generator circuit 122f controls input/output control circuit 122g through a data select circuit 122j, and is applied to a frequency detector 122k and a phase detector 122l to perform an automatic frequency control (AFC) and an automatic phase control (APC) for driving a disc motor 111 at a constant linear velocity (CLV) through PWM modulator 122m. A system clock generated by a system clock generator circuit 122p driven by a crystal oscillator 122n is applied to phase detector 122l.

The output data of input/output control circuit 123a of second signal processing system 123 is applied to syndrome detector 123b, error pointer control circuit 123c, error correct circuit 123d, and output circuit 123e. Syndrome detector 123b detects an error of data words and error correct circuit 123d corrects erroneous data words. Output circuit 123e is arranged to perform data interpolation as required. An output signal of output circuit 123e is converted into an analog signal by digital-to-analog (D/A) converter 126. An external memory control circuit 123f cooperates with data selector circuit 122j to control external memory 127 storing data necessary for error correction to fetch data necessary for error correction through input/output control circuit 123a.

Timing control circuit 123g receives a system clock from system clock generating circuit 122p to generate timing control signals necessary for error correction, interpolation and D/A conversion.

A muting control circuit 123h controls output circuit 123e at the time of error correction and at the start and end of playback under the control of an output signal from error pointer control circuit 123c or a signal from system controller 117 to perform a muting operation.

Audio signals produced by D/A converter 126 drive a speaker 130 through a low pass filter (LPF) 128 and an amplifier 129.

A sync circuit according to an embodiment of the present invention will be described referring to FIG. 4 and FIGS. 5A and 5B.

Figure 4:
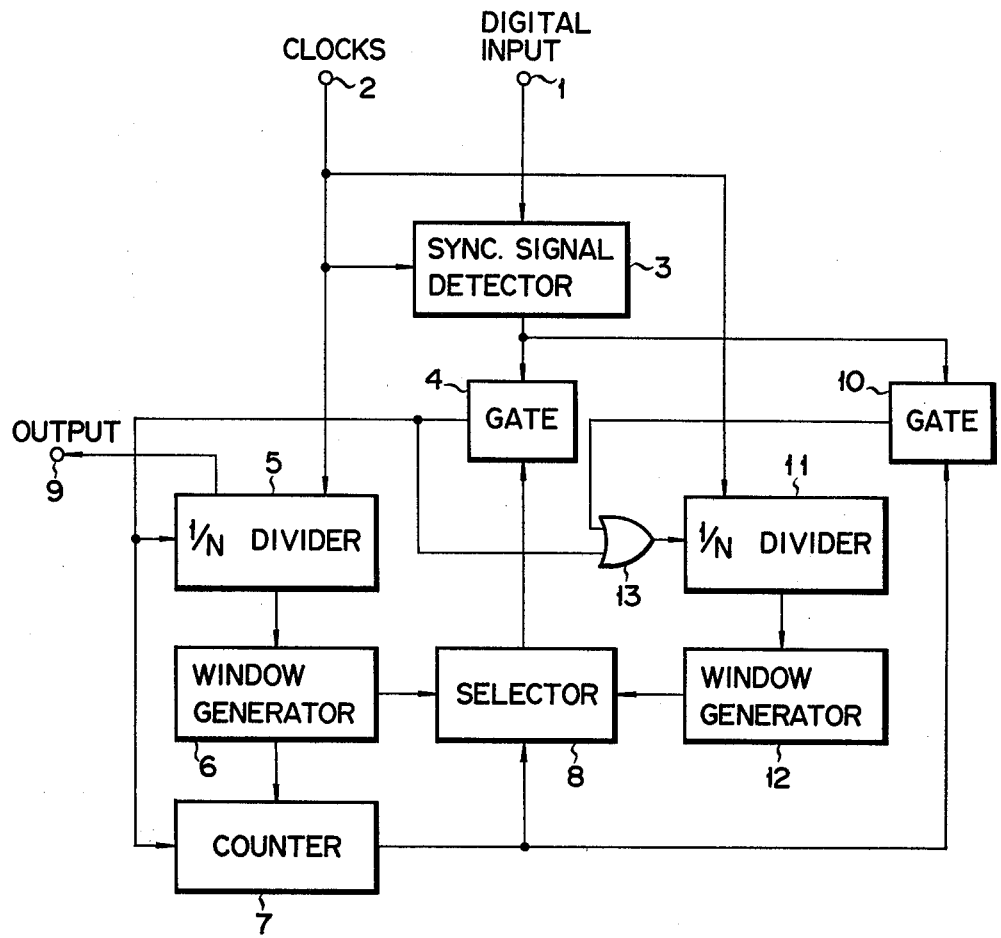
FIG. 4 shows a sync circuit according to an embodiment of the present invention.
Figure 5A:
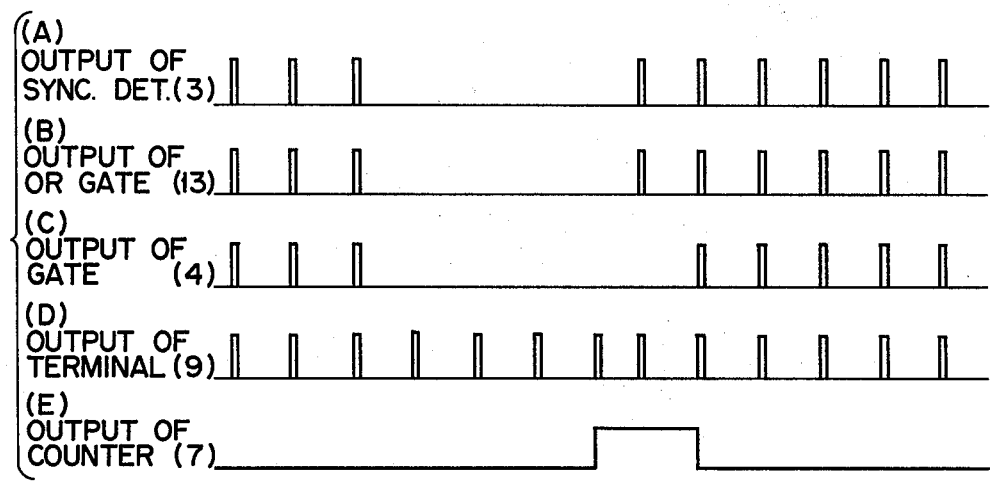
FIGS. 5A and 5B are timing diagrams useful in explaining the operation of the sync circuit of FIG. 4.

In FIG. 4, like numerals are used for designating like or equivalent portions in FIG. 1. The sync circuit is constructed so as to add a gate circuit 10, a 1/N frequency divider 11, a window generator 12 and an OR gate 13 to the prior art sync circuit of FIG. 1.

The output of sync signal detecting circuit 3 is connected to gate circuit 10 which is enabled when the output signal of counter 7 is high. The output signal of gate circuit 10 is connected through OR gate 13 to a clear terminal of 1/N frequency divider (scale-of-N counter) 11 for frequency-dividing the clock signal. The output signal of gate circuit 4 is connected to a clear terminal of frequency divider 11 through OR gate 13. The output of frequency divider 11 is connected to window generator 12 whose output is connected to selector 8. Selector 8 is so arranged as to, when the output of counter 7 is low, couple the output of window generator 6 to gate circuit 4 and, when the output of counter 7 is high, couple the output of window generator 12 to gate circuit 4.

In the sync circuit thus arranged, when an input signal having a plurality of frames each containing a sync signal is applied to input terminal 1, sync signal detector circuit 3 detects for every frame the sync signal contained in the input signal and applies a sync detect signal to first and second gate circuits 4 and 10. Frequency divider (first counter) 5 is cleared every time the output of gate circuit 4 goes high to send a sync control signal to output terminal 9. The output of first window generator 6 goes high during several bits in and near the N-th bit at which the next frame sync control signal is to be produced after frequency divider 5 produces a frame sync control signal. The output signal of window generator 6 is applied to gate circuit 4 through selector 8. When sync signal detector circuit 3 and 1/N frequency divider 5 are normally synchronized with each other, the output of gate circuit 4 goes high only when the output signal of sync signal detector circuit 3 falls within a window formed by window generator 6, thereby preventing an error due to noise other than the sync signal.

When frame sync signals cannot be detected because of the presence of dropout, or the synchronization is lost, counter (second counter) 7 is counted up every frame by the window generator 6. When counter 7 counts a preset number of frames e.g. four frames, its output becomes high, as indicated in FIG. 5A. As a result, the output of second window generator 12 is coupled to gate circuit 4 and gate circuit 10 is enabled. When a normal synchronization is established, that is, the output of counter 7 is low, frequency divider (third counter) 11 is cleared by an output signal of gate circuit 4 through OR gate 13 and thus synchronized with frequency divider 5. However, when the output of counter 7 is high, frequency divider 11 is cleared by the output signal of sync signal detecting circuit 3 through gate circuit 10 and OR gate 13. Accordingly, the output of window generator 12 will go high during several bits in and near the N-th bit counted from this time to enable gate 4. Accordingly, when an output signal which is first produced from sync signal detector circuit 3 and clears divider 11, as shown in FIG. 5A, is a sync signal, a sync detect signal next produced from sync signal detector 3 is derived from gate circuit 4 to clear frequency divider 5 and counter 7. For this reason, succeeding sync detect signals produced by sync signal detecting circuit 3 are derived from gate circuit 4 enabled every frame by window generator 6 so that synchronization is established between sync signal detector circuit 3 and frequency divider 5.

Figure 5B:
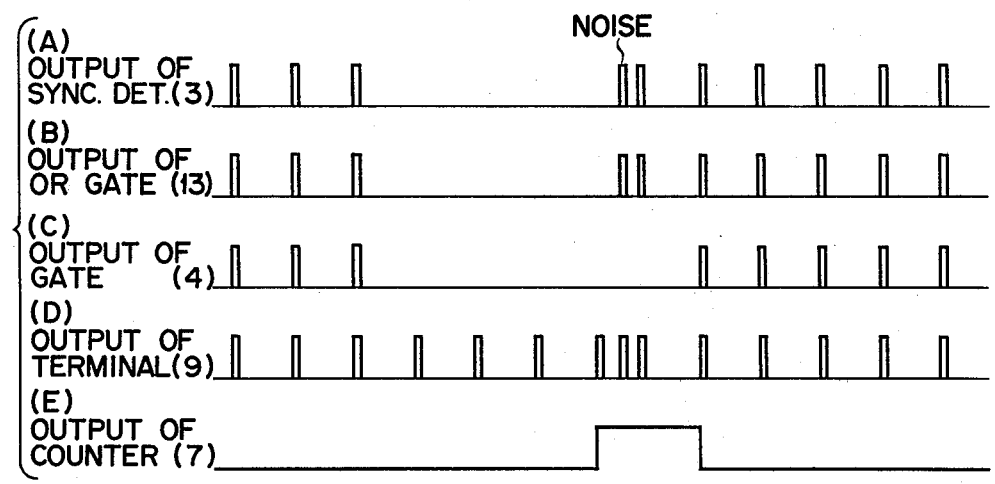
Figure 6:
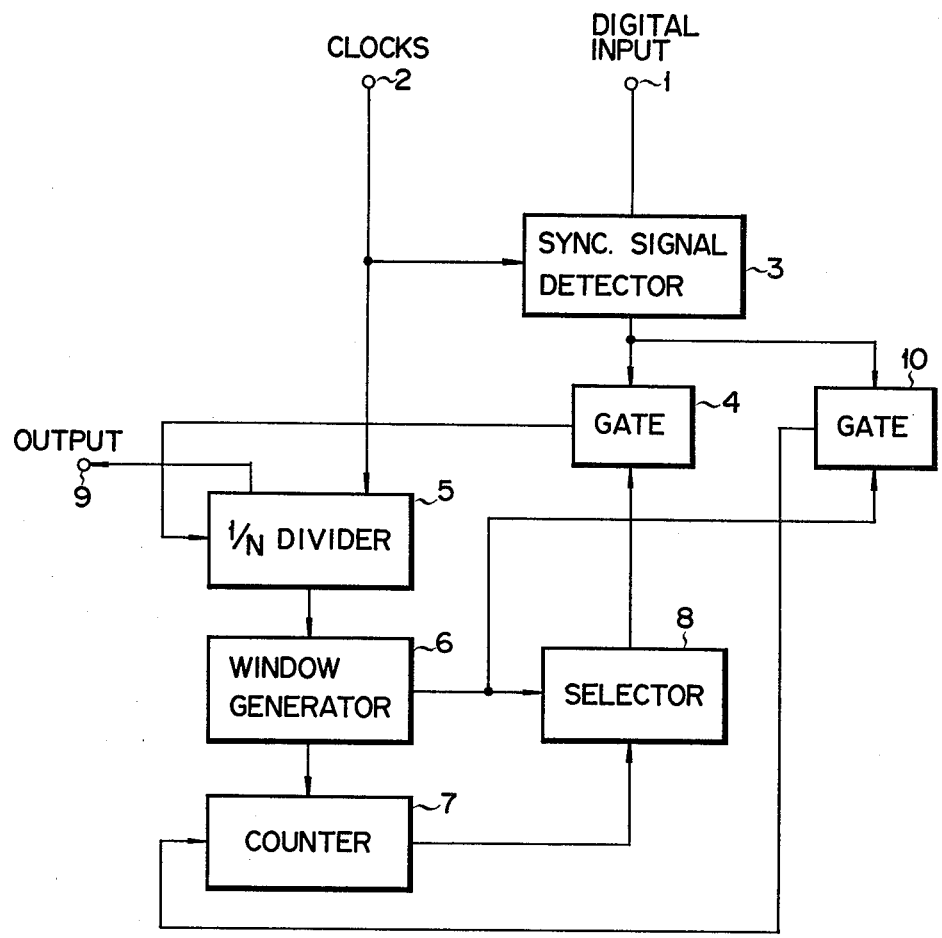
FIG. 6 shows a sync circuit according to another embodiment of the present invention.

As shown in FIG. 5B, when noise is first produced by sync signal detector circuit 3 after the output of counter 7 has gone high, frequency divider 11 is cleared by the noise output. However, during several bits in and near the N-th bit counted from this time, that is, so long as an output signal of sync signal detector circuit 3 does not fall within a window formed by window generator 12, no output signal is taken from gate circuit 4. When sync signals are detected in succession to the noise output, the second and succeeding sync signals are derived from gate circuit 4, so that synchronization is obtained between sync signal detector circuit 3 and frequency divider 5, as in the case of FIG. 5A.

FIG. 4 shows another embodiment of the sync circuit of the present invention, in which like reference numerals are used to designate like or equivalent portions in FIG. 1. The sync circuit of this embodiment is provided with gate circuit 10 in the prior art sync circuit. Gate circuit 10 is enabled by a window output of window generator 6 to clear counter 7 by an output signal of sync signal detecting circuit 3.

In such a sync circuit, when an input signal is applied to input terminal 1, sync signal detector circuit 3 detects the sync signal contained in each frame of the input signal and applies the detect signal to first and second gate circuits 4 and 10. Frequency divider 5 is cleared every time the output signal of gate circuit 4 goes high and sends a sync detect signal to output terminal 9. The output signal of window generator 6 goes high during several bits in and near the N-th bit at which frequency divider 5 should produce the next frame sync control signal. The window output is coupled to gate circuit 4 through selector 8. When sync signal detecting circuit 3 is normally synchronized with frequency divider 6, the output of gate circuit 4 goes high only when an output signal of sync signal detecting circuit 3 falls within a window formed by window generator 6. When the synchronization is established, counter 7 is cleared every frame by an output signal of sync signal detector circuit 3 through gate circuit 10.

When the frame sync signals cannot be detected counter 7 is not cleared by an output signal of gate circuit 10 but counted up by window generator 6.

Figure 7A:
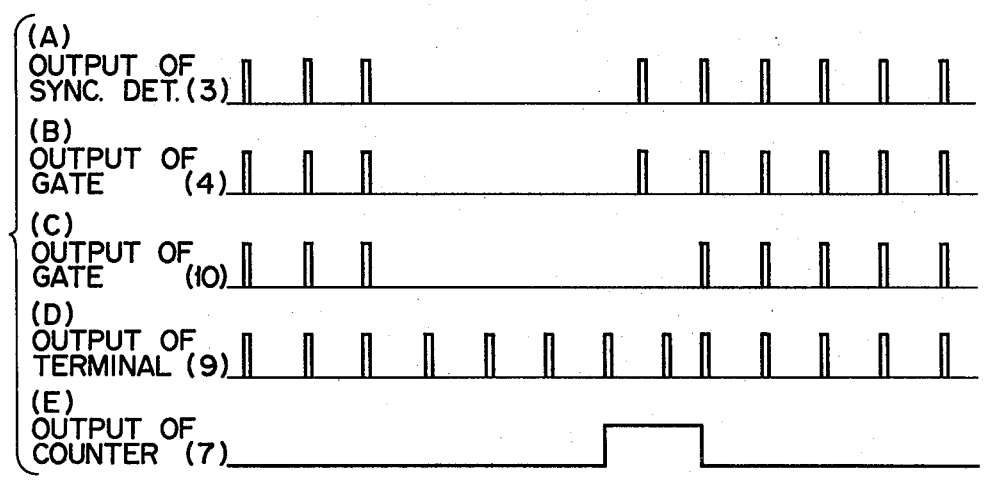
FIGS. 7A and 7B show timing diagrams for explaining the operation of the sync circuit of FIG. 6.

When counter 7 counts the preset number of frames, its output becomes high, as shown in FIG. 7A. As a result, the output signal of counter 7 enables gate circuit 4 through selector 8 to couple the output of sync signal detecting circuit 3 to frequency divider 5. When sync signals are detected by sync signal detecting circuit 3 when the output of the counter is high, the first output signal clears frequency divider 5. Accordingly, the next output signal comes within a window formed by window generator 6, so that frequency divider 5 and counter 7 are both cleared. Thereafter, when sync signal detector circuit 3 normally detects sync signals, frequency divider 5 and counter 7 are cleared every frame by outputs of gate circuits 3 and 10, respectively.

Figure 7B:
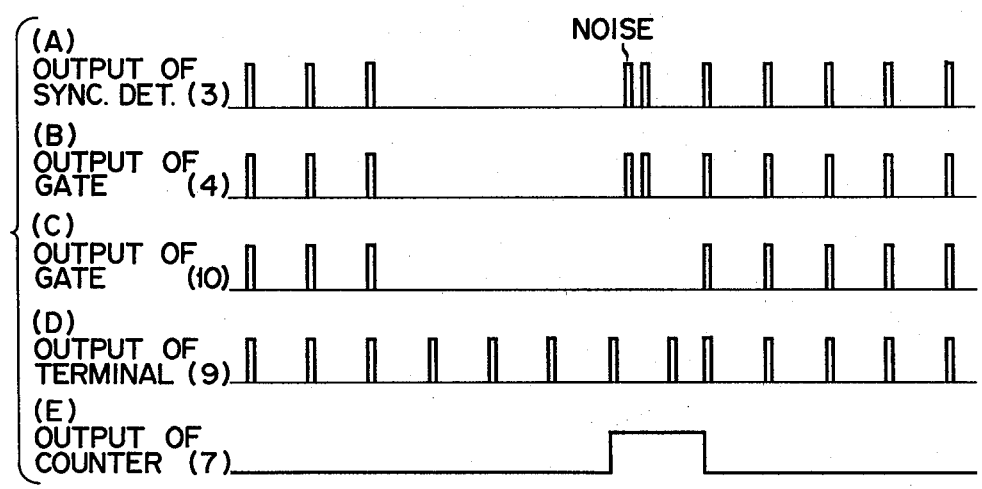

If, as shown in FIG. 7B, the first output signal of sync signal detector circuit 3 is noise and thereafter sync signals are normally detected after the output of counter 7 has become high, then frequency divider 5 will be cleared by the noise output, but counter 7 will not be cleared. When the sync detect signals are successively produced by sync signal detecting circuit 3 after the noise output is produced, the first detect signal clears frequency divider 5, but does not clear counter 7 since gate circuit 10 is not enabled. At the time that the second detect signal is produced by sync signal detecting circuit 3, gate circuit 10 has been enabled by an output signal of window generator 6. Accordingly, frequency divider 5 and counter 7 are cleared by the second detect signal through gate circuits 4 and 10, respectively. For this reason, gate circuit 4 is then enabled every frame by the output signal of window generator 6 and the synchronization between sync signal detecting circuit and frequency divider 5 is restored.

What we claim is:

1. A synchronizing circuit comprising:
   frame sync signal detecting circuit means connected to receive clock pulses and a digital input signal having a plurality of frames each consisting of N bits and having a frame sync signal for detecting the frame sync signal to produce a sync detect output signal;
   first counting means counting clock pulses and connected to receive an output signal of said frame sync signal detecting circuit means for producing an output signal synchronized with the output signal of said sync signal detecting circuit means, said first counting means being so arranged to be cleared by the output signal of said sync signal detecting circuit means and to provide an output signal each time N clock pulses are counted even if said sync signal detecting circuit means fails to detect the frame sync signal;

first window generating means responsive to said first counting means for generating a window output signal at intervals at which said sync signal detecting circuit means detects the sync signals;

second counting means for counting said window output signal of said first window generating means, said second counting means being cleared by each output signal of said sync signal detecting circuit means when said first counting means is synchronized with said sync signal detecting circuit means, and having its output state changed from a first state to a second state when said second counting means counts a given number of window output signals of said first window generating means when said sync signal detecting circuit means fails to detect the sync signals;

a first gate circuit connected between said sync signal detecting circuit means and said first and second counting means for, when enabled, supplying an output signal of said sync signal detecting circuit means to said first and second counting means to clear said first and second counting means;

a second gate circuit connected to receive said output signal of said sync signal detecting circuit means, said second gate circuit being enabled by an output signal of said second counting means when said second counting means is in said second output state;

third counting means for counting the clock pulses to provide an output signal each time said third counting means counts N clock pulses, said third counting means being cleared by an output signal of said first and second gate circuits;

a second window generating means connected to said third counting means for forming a window output signal at time intervals taken for said third counting means to count approximately N clock pulses; and means responsive to said second counting means for selectively coupling one of the output signals of said first and second window generating means to said first gate circuit to enable said first gate circuit, such that the window output signal of said first window generating means is applied to said first gate circuit when said second counting means is in said first output state and the window output signal of said second window generating means is applied to said first gate circuit when said second counting means is in said second output state.

2. A synchronizing circuit comprising:

frame sync signal detecting circuit means connected to receive clock pulses and a digital input signal having a plurality of frames each consisting of N bits and having a frame sync signal for detecting the frame sync signal to produce a sync detect output signal;

first counting means counting the clock pulses and connected to receive an output signal of said frame sync signal detecting circuit means for producing an output signal synchronized with the output signal of said sync signal detecting circuit means, said first counting means being so arranged to be cleared by the output signal of said sync signal detecting circuit means and to provide an output signal each time N clock pulses are counted even if said sync signal detecting circuit means fails to detect the frame sync signal;

window generating means responsive to said first counting means for generating a window output signal at intervals at which said sync signal detecting circuit means detects the sync signals;

second counting means for counting the window output signal of said window generating means, said second counting means being cleared by each output signal of said sync signal detecting circuit means when said first counting means is synchronized with said sync signal detecting circuit means, and having its output state changed from a first state to a second state when said second counting means counts a given number of window output signals of said first window generating means when said sync signal detecting circuit means fails to detect the sync signals;

a first gate circuit connected between said sync signal detecting circuit means and said first counting means for, when enabled, supplying an output signal of said sync signal detecting circuit means to said first counting means to clear said first counting means;

a second gate circuit connected between said sync signal detecting circuit means and said second counting means, said second gate circuit being enabled by the window output signal of said window generating means to apply an output signal of said sync signal detecting circuit means to said second counting means to clear said second counting means; and means responsive to said second counting means to supply the window output signal of said window generating means to said first gate circuit when said second counting means is in said first output state to enable said first gate circuit each time the window output signal is produced, and to enable said first gate circuit until said second counting means is cleared when said second counting means is in said second output state.

* * * * *